Aug. 18, 1959  W. G. ROBINSON  2,900,004
DETACHABLE TRACTION DEVICE FOR WHEELS
Filed Nov. 26, 1956

INVENTOR.
Walter G. Robinson
BY
ATTORNEY

United States Patent Office 2,900,004
Patented Aug. 18, 1959

2,900,004

DETACHABLE TRACTION DEVICE FOR WHEELS

Walter G. Robinson, Walpole, Mass.

Application November 26, 1956, Serial No. 624,292

1 Claim. (Cl. 152—226)

This invention relates to traction equipment for vehicle wheels and, in particular, to an anti-skid device which is designed to be attached to an automobile tire while resting on a road surface and especially at a time when the wheel may have stopped turning due to loss of traction, for example, in heavy snow and similar conditions.

It is an object of the invention to devise an efficient, durable and simple anti-skid apparatus which can be very quickly attached to an automobile tire. Another object is to provide an anti-skid arrangement which is so designed as to permit attachment entirely from a point outside of a wheel and tire assembly. Still another object is to devise an assembly of tire engaging parts which can be easily installed at any point along the circumferential length of a tire which is accessible when a part of the wheel is imbedded in deep snow and has lost its traction. It is further an object of the invention to devise a unique adjusting and tightening arrangement for an anti-skid device which is particularly suited for use in engaging anti-skid cleats against tread surfaces of an automobile tire.

These and other objects and novel features will be more clearly understood and appreciated from the following description of a preferred embodiment of the invention selected for purposes of illustration and shown in the accompanying drawings, in which.

The anti-skid device of the invention is based upon the novel concept of combining with a plurality of cleated retaining elements a pair of cooperating ring members which function to simultaneously clinch the cleated retaining elements about a tire tread and, at the same time, resist any tendency for these cleated retaining elements to be pulled off over the tread as a result of such clinching.

The principal parts of this anti-skid device comprise a plurality of cleated retaining elements; a positioning ring for locating and supporting the cleated retaining elements in circumferentially spaced-apart relationship around a tire periphery when the cleated retaining elements are engaged against tire tread and sidewall portions; and means, including a split locking ring, for simultaneously exerting radially inwardly directed forces on each of the said cleated retaining elements whereby the cleated retaining elements are caused to clinch againt the tire tread and constitute traction surfaces.

In the preferred form of the invention illustrated in the accompanying drawings, numeral 2 denotes a vehicle wheel on which is mounted an automobile tire 3 which is formed with conventional tread and sidewall surfaces. In accordance with the invention, I provide special U-shaped cleated retaining elements of which one such element is most clearly shown in Fig. 2 and generally indicated by the arrow C. As will be observed from an inspection of Fig. 2, the cleated retaining element C includes cleates as 4, 5, 6, etc., and a cleated supporting frame consisting of a pair of reversely bent rod portions as 7 and 8. These rod portions are preferably constructed of a resilient material such as steel wire to constitute spring-like bodies. The U portion of the cleated retaining element is intended to be of a size such that it will readily fit over the tread and sidewall portions of standard size tires.

An important feature of the invention is the use of a plurality of these cleated retaining elements loosely grouped together in a closely abutting position on a positioning ring so that all of the cleated retaining elements may be engaged over the tire tread at some one point which is most accessible at a time when the tire may be embedded in deep snow. From this initial installation position, the cleated retaining elements may then be moved around the periphery of the tire tread in suitably circumferentially spaced-apart relationship.

Figure 5:
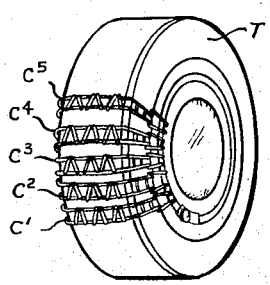
Fig. 5 is a perspective view showing the anti-skid device of the invention in the position initially assumed by the device as it is being attached about a tire.

Thus, in Fig. 5, I have shown a group of the cleated retaining elements $C^1$, $C^2$, $C^3$, $C^4$, $C^5$ in an initial installation position on a tire T and, as noted, a group of five cleated retaining elements are included. However, I may desire to employ a greater or lesser number as, for example, three only, as suggested in Fig. 1. It will readily be appreciated that the group of cleat elements can readily be attached as a unit at any point around the periphery of the tire T and may thereafter be conveniently moved around into circumferentially spaced-apart relationship.

With cleated retaining elements of the character described, it is important to provide means for holding each one of the cleated elements in a correctly separated position and to then draw or force the cleated retaining elements against the tire tread while thus held. For this purpose, I have devised the combination of cooperating rings earlier referred to, together with a novel arrangement of eye portions through which the rings are passed and which eye portions are comprised by integral parts of the cleat retaining elements.

Figure 2:
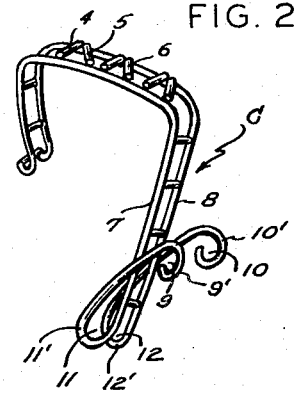
Fig. 2 is a detail perspective view showing a portion of the invention as comprised by one cleat retaining member and illustrating this cleat member removed from the automobile wheel.

As best shown in Fig. 2, I construct each cleat retaining element with eye portions as 9 and 10 and additional eye portions 11 and 12. This is conveniently accomplished, for example, by reversely forming the steel wire frame pieces 7 and 8 so that they constitute outer loops 9', 10' and inner loops 11' and 12'.

It is pointed out that I further construct these several loop portions so that the eyes 9 and 10 extend outwardly away from the eyes 11 and 12 in an offset manner, as suggested in Fig. 2.

Figure 1:
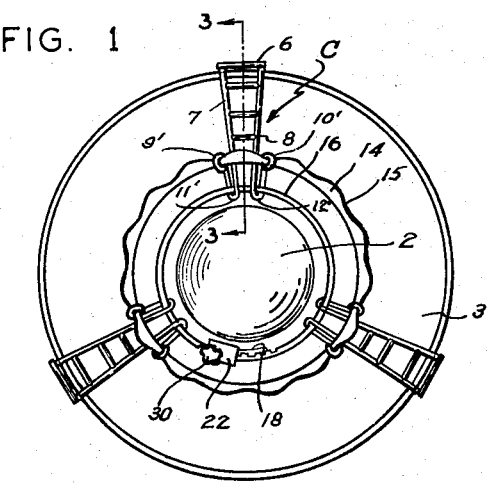
Fig. 1 is a side elevational view of an automobile wheel showing the traction device of the invention secured thereto in an operative position.
Figure 3:
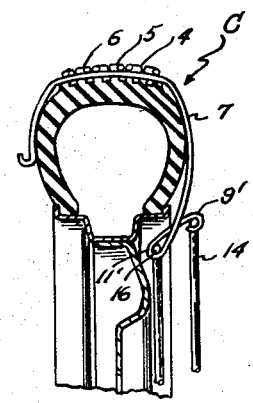
Fig. 3 is a cross-sectional view taken on the line 3—3 of Fig. 1.

The cleated retaining elements are positioned and held on a tire, as illustrated in Figs. 1 and 3, by means of the positioning ring 14 and the cooperating locking ring 16. The ring 14 is preferably an endless ring on which looped portions of the cleated retaining elements are loosely received, as shown in Fig. 3.

In one type of construction, I form the ring 14 with an irregular surface to constitute scalloped edges. These edges allow the respective looped portions of the cleated retaining elements to be slid over them but normally act to hold any given cleat in a substantially fixed position.

The locking ring 16 differs from 14 in that it is split to provide two ends which can be slid past one another to vary the ring diameter. This locking ring 16 is received through the loop portions of the cleats, as represented by the looped portions 11' and 12' of cleat C and, when thus supported, it will be apparent that ring 16 occurs in concentric relationship with respect to ring 14 and, moreover, the ring 16 is axially offset with respect to ring 14.

Figure 4:
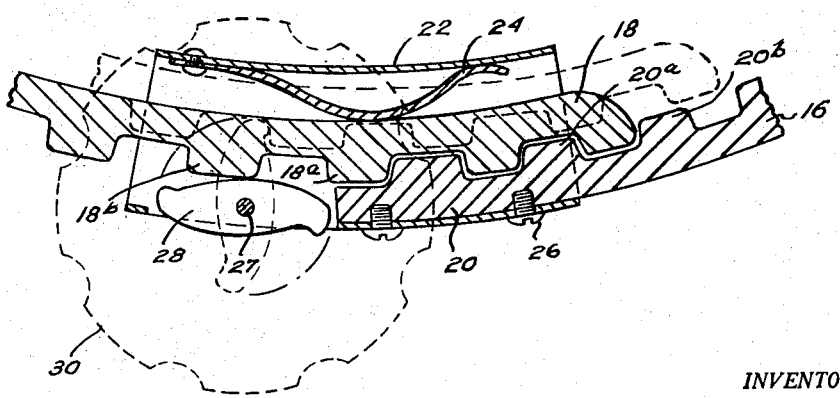
Fig. 4 is an enlarged detail cross-sectional view of one suitable tightening mechanism for the anti-skid device of the invention.

Numerals 18 and 20 denote the two ends of ring 16, as is best shown in Fig. 4. As indicated therein, these ends 18 and 20 are formed with irregular or notched surfaces defined by spaced teeth as 18a, 18b, etc., in the case of end 18, and by teeth 20a, 20b, etc., in the case of end 20. These irregular surfaces are designed to match so that they can be moved into interlocking relationship, as suggested in Fig. 4. Normally, they are held together in some desired interlocking position by suitable closure means.

As one example of suitable closure means, I have devised a sleeve 22, best shown in Fig. 4, which is fitted with a flat spring 24 adjusted to bear resiliently against the inner surface of ring end 18. The sleeve may be secured by rivets or screws 26 to the other end 20 of the ring 16. Pivotally mounted at 27 in this sleeve 22 is a cam element 28 and handle 30.

The cam 28 is shaped so that, when rotated by handle 30, it will act to force the ring end 18 outwardly against the spring 24 and thereafter will operate to advance this end 18 past the end 20 to another interlocking position, thus contracting the ring 16 and simultaneously exerting radially inwardly directed forces on the loops as 11', 12' of the cleating retaining elements.

Another important feature of the invention is the cooperative action of the two rings resulting from reducing the diameter of ring 16 in the manner above indicated. It will be apparent that, when radially inwardly directed forces are exerted on the cleat retaining elements, these members are pulled into tight engagement with the tire. At the same time, because of the axially offset relationship of the loops 9' and 10' with respect to loop 11' and 12', which relationship is present in all of the cleat retaining elements, there will necessarily develop a straightening out of the frame pieces 7 and 8 and the loops 9', 10' seek to move toward the frame pieces, thus causing the ring 14 to tend to move towards the adjacent sidewall surface of the tire. This action, it will be observed, will oppose any tendency of the cleat retaining hooks from pulling off over the tire.

From the foregoing description, it will be evident that I have devised a novel anti-skid device and that I have provided a means of rapidly and conveniently attaching such a device to a tire. It is intended that the invention may be modified in various respects. For example, special forms of cleats may be made to fit into grooves in tire treads. Similarly, I may employ other means of contracting the locking ring, as well as mounting this member on the cleated retaining elements. Various other changes may be resorted to within the scope of the appended claim.

Having thus described my invention, what I claim is:

An anti-skid device for a vehicle wheel of the class having a tire mounted thereon, said device comprising a plurality of resilient, U-shaped retaining members, cleats fixed to said retaining members, said retaining members presenting extremities which are reversely bent to define two sets of ring supporting eyes, one of said sets of eyes being constructed and arranged in a circumferentially spaced-apart manner and projecting axially inwardly with respect to the said cleats, the other of said sets of eyes being constructed and arranged in circumferentially spaced-apart relation and projecting radially and axially outwardly away from the said cleats, a fixed circumferential ring member located through said outwardly projecting set of eyes, said ring being supported by the eyes in an axially outwardly offset position, a variable circumferential locking ring located through said first set of inwardly projecting eyes and being supported in axially spaced relation to said fixed circumferential ring, said locking ring including interlocking surfaces and a device for securing the interlocking surfaces in a tightened position of adjustment whereby a radially exerted resistance force is present to oppose displacement of the U-shaped retaining members from said tire.

References Cited in the file of this patent

UNITED STATES PATENTS

| | | |
|---|---|---|
| 1,768,392 | Benien | June 24, 1930 |
| 1,822,748 | Rivers et al. | Sept. 8, 1933 |
| 2,290,398 | Wellington | July 21, 1942 |
| 2,528,165 | Nickerson | Oct. 31, 1950 |
| 2,654,412 | Caloiaro | Oct. 6, 1953 |
| 2,743,755 | Fullerton | May 1, 1956 |